3,309,399
TERTIARY AMINE OXIDES
Mitchell Frank Zienty, Elkhart, Ind., and Harold Charles Stalter, Edwardsburg, Mich., assignors to Miles Laboratories, Inc., Elkhart, Ind., a corporation of Indiana
No Drawing. Filed Apr. 15, 1964, Ser. No. 360,084
4 Claims. (Cl. 260—490)

This invention relates to novel amine-N-oxide compositions of matter and to a process for their production. More particularly, it relates to tertiary benzyl amine-N-oxides and to a process for the preparation thereof involving the reaction between a tertiary benzyl amine and hydrogen peroxide.

In accordance with the present invention, a novel composition of matter is provided which comprises an amine-N-oxide selected from the class consisting of (A) compounds of the formula:

(1)

wherein $R^1$ is selected from the class consisting of benzyl, methyl, beta-hydroxyethyl and beta-acetoxyethyl radicals and $R^2$ is selected from the class consisting of methyl, beta-hydroxyethyl and beta-acetoxyethyl radicals, and (B) acid salts of amine-N-oxides of the formula:

(2)

wherein $R^1$ and $R^2$ are defined above and X is an acid anion.

The amine-N-oxide compounds represented by formula (1) above can be prepared by a process which comprises reacting an amine of the formula:

(3)

wherein $R^1$ and $R^2$ are defined above, with an oxidizing agent, such as monopersulfuric acid or hydrogen peroxide. Hydrogen peroxide is the preferred oxidizing agent. The hydrogen peroxide and amine reactants are conveniently employed in equimolar amounts. Preferably, the hydrogen peroxide is present in about 10 to about 75 mole percent excess. The reaction conditions are not narrowly critical. Reaction temperature from about 10° C. to about 80° C. can be employed. Preferably, the reaction temperature is about 60° C. to about 65° C. While the reaction can take place without a solvent, it is preferred that a solvent for the reactants be employed. Illustrative solvents are water, alcohols, such as methanol and ethanol, chlorinated aliphatic hydrocarbons, such as chloroform and ethyl bromide, and the like. Methanol is the preferred solvent. The solvent is conveniently employed in an amount to just dissolve all the reactants, but larger or smaller amounts of solvent can be used if desired.

The acid anions represented by X in Formula 2 above are exemplified by chloride, acetate, oxalate and the like. The acid salts represented by Formula 2 above can be prepared by reacting the amine-N-oxide with the particular acid desired, preferably in the presence of a solvent, such as those mentioned above.

The acetate salts of amine-N-oxides represented by Formula 2 above, wherein X is acetate, can also be prepared by a novel process which comprises reacting an amine of the Formula 3 above with an oxidizing agent, such as hydrogen peroxide, in the presence of acetic acid. The amounts of hydrogen peroxide and reaction temperatures are the same as those described above. Acetic acid is employed as a solvent, and it is preferably employed in an amount to just dissolve all the reactants, but larger or smaller amounts of solvent can be used if desired.

The reactants and solvents employed in this invention are well known materials and can be readily obtained from commercial sources.

The compositions of the present invention are useful as anti-rust agents, rust removers, polymerization inhibitors, emulsion stabilizers, paper coating dispersion stabilizers, and electrolytes. They can also be used in pharmacological applications such as antibacterials and fungicides.

The invention will be described in further detail in the following examples.

*Example 1*

A 106 g. (0.5 mole) quantity of N,N-dibenzyl-N-methylamine was charged to a 1-liter 3-necked reaction flask equipped with agitator, condenser, dropping funnel and thermometer. Approximately 250 ml. of methanol were added. While maintaining a reaction temperature of 20° C.–22° C. by means of an ice bath and agitating the contents of the flask, 49 ml. of 50 weight percent aqueous hydrogen peroxide solution (0.85 mole $H_2O_2$) were added dropwise over a period of 1 hour. After additon of the hydrogen peroxide was completed, layering was noted in the reaction flask. The reaction mixture was agitated and refluxed for a period of 2–3 hours. No layering was noted after this time. The methanol was stripped off under vacuum and the residue dissolved in chloroform and dried with sodium sulfate. The chloroform was then stripped off under vacuum and the oily product crystallized on standing. The crystalline material was broken up and slurried with anhydrous diethyl ether, filtered and dried in a vacuum desiccator. This hygroscopic compound was obtained in a 97.5 weight percent yield which contained 89.6 weight percent as N,N-dibenzyl-N-methylamine-N-oxide. The compound had a melting point of 151° C.–152° C. Nitrogen analysis obtained the results of:

Theory for $C_{15}H_{17}NO$: 6.16 weight percent. Found: 6.23 weight percent.

*Example 2*

A 0.5 mole quantity of N-benzyl-N,N-dimethylamine was mixed with about 250 ml. of methanol and reacted with 0.85 mole of 50 weight percent aqueous hydrogen peroxide as described in Example 1 above. A solid crystalline N-benzyl-N,N-dimethylamine-N-oxide product was obtained in a 90 weight percent yield which contained 86.3 weight percent of the amine oxide. The product had a melting point of 56° C.–58° C. Nitrogen analysis obtained the results of:

Theory for $C_9H_{13}NO$: 9.28 weight percent. Found: 9.30 weight percent.

*Example 3*

A 0.5 mole quantity of N,N-dibenzyl-N-beta-hydroxyethylamine was mixed with about 250 ml. of methanol and reacted with 0.85 mole of 50 weight percent aqueous hydrogen peroxide as described in Example 1 above. A white powder product was obtained in a 45 weight percent yield which contained 87 weight percent N,N-dibenzyl - N-beta-hydroxy-ethylamine-N-oxide. The compound had a melting point of 128° C.–130° C. Nitrogen analysis obtained the results of:

Thery for $C_{16}H_{19}NO_2$: 5.45 weight percent. Found: 5.63 weight percent.

*Example 4*

A 0.5 mole quantity of N-benzyl-N,N-di-beta-hydroxyethylamine was mixed with about 250 ml. of methanol and reacted with 0.85 mole of 50 weight percent aqueous hydrogen peroxide as described in Example 1 above. A white waxy solid was obtained in a 50 weight percent yield which contained 98.2 weight percent N-benzyl-N,N-di-beta-hydroxyethylamine-N-oxide. The compound had a melting point of 139° C.–141° C. Nitrogen analysis obtained the results of:

Theory for $C_{11}H_{17}NO_3$: 6.64 weight percent. Found: 6.70 weight percent.

Example 5

An 83 g. (0.5 mole) quantity of N-benzyl-N-methyl-N - beta - hydroxyethylamine was charged to a 1-liter 3-necked reaction flask equipped with agitator, thermometer, dropping funnel and condenser. While agitating the amine, 29 ml. of 30 weight percent aqueous hydrogen peroxide (0.5 mole) were added through the dropping funnel over a period of 1 hour. A temperature of 25° C. was maintained in the flask with an ice bath. Upon complete addition of the hydrogen peroxide, the flask was heated to 70° C. and maintained at this temperature for 2–3 hours. The flask and contents were cooled to room temperature and dissolved in 250 ml. of chloroform. The chloroform solution was dried with sodium sulfate and filtered with vacuum. The chloroform was stripped off from the filtrate under vacuum along with any remaining water. The oily product crystallized on standing in a refrigerator at 5° C. for 48 hours. The crystalline material was broken up, slurried in anhydrous diethyl ether, filtered and dried in a vacuum desiccator. This hygroscopic compound was obtained in a 55 weight percent yield which contained 94.4 weight percent N-benzyl-N-methyl - N-beta-hydroxyethylamine-N-oxide. The compound had a melting point of 97° C.–100° C. Nitrogen analysis obtained the results of:

Theory for $C_{10}H_{15}NO_2$: 7.73 weight percent. Found: 7.72 weight percent.

Example 6

A 121 g. (0.5 mole) quantity of N,N-dibenzyl-N-beta-hydroxyethylamine was charged to a 1-liter 3-necked reaction flask equipped with agitator, condenser and thermometer. Acetic anhydride (400 ml.) was then added to the flask which was maintained at 25° C.–30° C. After addition of the acetic anhydride was completed, the reaction was heated to 60° C. with agitation for 2 hours. The temperature was then increased to 80° C.–90° C. and maintained for 2–3 hours. Then the reaction was cooled and the excess acetic anhydride and acetic acid were distilled off under vacuum. The oily N,N-dibenzyl-N-beta-acetoxyethylamine was then mixed with 250 ml. methanol and reacted with 49 ml. (0.85 mole) of 50 weight percent aqueous hydrogen peroxide as described in Example 1 above. A hygroscopic crystalline product was obtained in 91 weight percent yield which contained 91.5 weight percent N,N-dibenzyl-N-beta-acetoxyethylamine-N-oxide. The compound had a melting point of 100° C.–102° C. Nitrogen analysis obtained the results of:

Theory for $C_{18}H_{21}NO_2$: 4.95 weight percent. Found: 4.69 weight percent.

Example 7

A 0.5 mole quantity of N,N-dibenzyl-N-methylamine was charged to a 1-liter 3-necked reaction flask equipped with agitator, thermometer, condenser and dropping funnel. About 250 ml. of glacial acetic acid was added slowly. The flask was cooled during addition with an ice bath. While agitating the amine-acetic acid solution, 50 ml. of 50 weight percent aqueous hydrogen peroxide (0.85 mole) were added through the dropping funnel. After 30 ml. of the hydrogen peroxide had been added, the temperature of the reaction flask was increased to 70° C.–80° C. and maintained at this temperature for 2–3 hours. The remaining 20 ml. of the hydrogen peroxide were added dropwise while maintaining the 70° C.–80° C. temperature. The reaction flask contents were agitated and this temperature was maintained for 9 hours. The excess acetic acid and the water were distilled off carefully under vacuum. After the volume of the reaction mixture had been reduced to one-half the original volume, 250 ml. of water were added and the contents were concentrated as far as possible under vacuum. The contents of the flask were then dissolved in 250 ml. of chloroform and then mixed with sodium carbonate. This treatment did not liberate the amine-N-oxide from its acetate salt. The chloroform solution was filtered to remove sodium carbonate and some sodium acetate. The filtrate was dried with sodium sulfate and filtered again with vacuum. All of the chloroform was stripped off under vacuum and the oily product crystallized on standing 48 hours in a refrigerator at 5° C. The product was broken up and slurried in anhydrous diethyl ether, filtered and then dried in a vacuum desiccator. An extremely hygroscopic solid was obtained in 95 weight percent yield which contained 91.4 weight percent N,N-dibenzyl-N-methylamine-N-oxide acetate. The compound had a melting point of 98° C.–104° C. Nitrogen analysis obtained the results of:

Theory for $C_{17}H_{21}NO_3$: 4.87 weight percent. Found: 4.75 weight percent.

Example 8

A 0.5 mole quantity of N-benzyl-N,N-dimethylamine was reacted with 0.85 mole of 50 weight percent aqueous hydrogen peroxide in the presence of 250 ml. glacial acetic acid as described in Example 7 above. A crystalline product was obtained in a 92 weight percent yield which contained 94.2 weight percent N-benzyl-N,N-dimethylamine-N-oxide acetate. The compound had a melting point of 45° C.–50° C. Nitrogen analysis obtained the results of:

Theory for $C_{11}H_{17}NO_3$: 6.64 weight percent. Found: 6.90 weight percent.

The compounds of the present invention have a wide variety of uses. Some exemplary uses are described in the following examples.

Example 9

A mild steel bolt was immersed for a month at room temperature in a 37 weight percent aqueous solution of N-benzyl-N,N-dimethylamine-N-oxide prepared in accordance with Example 2 above. There were no visible signs of rusting on the bolt. A similar bolt immersed in tap water showed signs of rusting within 5 hours at room temperature. A mild steel bolt immersed overnight at room temperature in a 1 weight percent aqueous solution of N-benzyl-N,N-dimethylamine-N-oxide showed only minor signs of rusting. This amine-N-oxide is thus useful as an anti-rust agent.

Example 10

A mixture of 1.5 g. of ammonium citrate and 25 ml. of an aqueous solution containing 37 weight percent N-benzyl-N,N-dimethylamine-N-oxide prepared as described in Example 2 above was applied to a rusty iron strip. This mixture contained 6 weight percent ammonium citrate. The rust was loosened and removed in only about 12 hours. A similar rusty strip treated with a 6 weight percent aqueous solution of ammonium citrate required 48 hours to remove the rust. This amine-N-oxide is thus useful in a rust removing composition.

Example 11

Mild steel bolts were separately immersed in tap water and aqueous solutions containing respectively 10 weight percent of N-benzyl-N,N-di-beta-hydroxyethylamine-N-oxide prepared as described in Example 4, and N-benzyl-N - methyl - N - beta - hydroxyethylamine - N - oxide prepared as described in Example 5. After 168 hours at room temperature the bolts immersed in tap water were extremely rusty while the bolts immersed in the separate amine-N-oxide solutions showed only minor signs of rusting. N-benzyl-N,N-di-beta-hydroxyethylamine-N-oxide and N-benzyl-N-methyl-N-beta-hydroxyethylamine-N-oxide are thus useful as anti-rust agents.

*Example 12*

The effect of compounds of the present invention as polymerization inhibitors is shown by the following data. Separate samples were prepared containing respectively: (I) 10 g. acetyltriallylcitrate monomer (ATAC); (II) 10 g. ATAC+1 drop of t-butyl perbenzoate polymerization catalyst; (III) 10 g. ATAC+0.5 g. N,N-dibenzyl-N-methylamine-N-oxide prepared as in Example 1; (IV) 10 g. ATAC+0.5 g. N,N-dibenzyl-N-methylamine-N-oxide acetate prepared as in Example 7; (V) same as (III) plus 1 drop of t-butyl perbenzoate; (VI) same as (IV) plus 1 drop of t-butyl perbenzoate. The samples were stored at 60° C. temperature for 6 days. The progress of polymerization was determined by increase in refractive index of the samples.

| Sample | Refractive Index | |
|---|---|---|
| | Original | After 6 days |
| I | 1.4651 | Solid |
| II | 1.4651 | Solid |
| III | 1.4651 | [1] 1.4710 |
| IV | 1.4651 | [1] 1.4705 |
| V | 1.4651 | [1] 1.4719 |
| VI | 1.4651 | [1] 1.4719 |

[1] Liquid.

It is thus apparent that the presence of the amine-N-oxides retards polymerization of allylic type monomers even in the presence of a polymerization catalyst.

In summary, the present invention relates to novel tertiary benzyl amine-N-oxides and acid salts of tertiary benzyl amine-N-oxides as compositions of matter and to a process of producing such amine-N-oxides by hydrogen peroxide oxidation of the appropriate amine preferably in the presence of a solvent, such as methanol.

What is claimed is:
1. N,N-dibenzyl-N-beta-hydroxyethylamine-N-oxide.
2. N-benzyl-N,N-di-beta-hydroxyethylamine-N-oxide.
3. N-benzyl-N-methyl-N-beta-hydroxyethylamine-N-oxide.
4. N,N-dibenzyl-N-beta-acetoxyethylamine-N-oxide.

References Cited by the Examiner

UNITED STATES PATENTS 2,871,229  1/1959  Price _____ 260—570.9
3,021,361  2/1962  Pohland _____ 260—490

FOREIGN PATENTS 787,693  12/1957  Great Britain.

OTHER REFERENCES

Culvenor, C. C. J.: Amine Oxides, Reviews of Pure and Applied Chemistry, vols. 1–3, 1953, pages 83–114 (pages relied on 86–88).

Chemical Abstracts (1951), 45: 112f, 113C.

LORRAINE A. WEINBERGER, *Primary Examiner.*

V. GARNER, *Assistant Examiner.*